Figure 1:
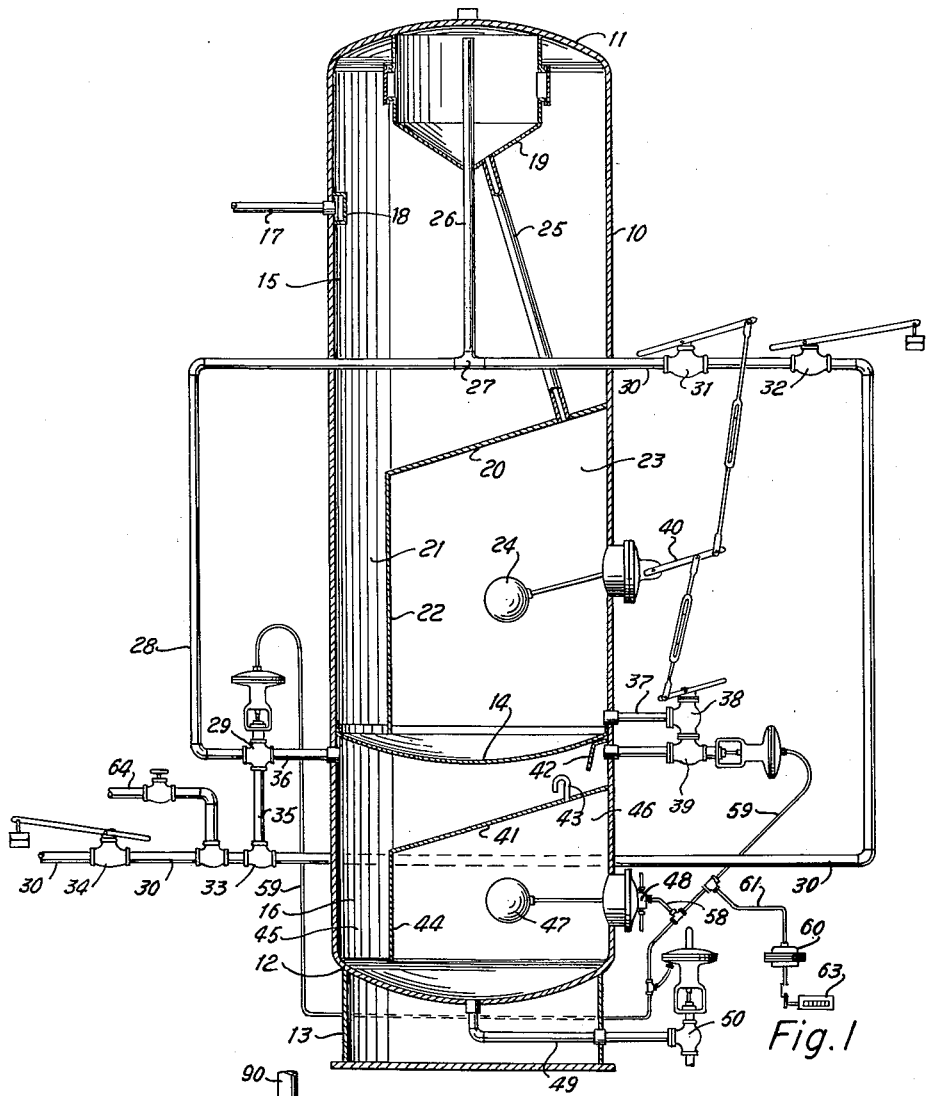

Feb. 20, 1962 J. P. WALKER ET AL 3,021,709
METHODS AND MEANS FOR SEPARATING LIQUIDS FROM PETROLEUM
STREAMS AND METERING THE SEPARATED LIQUIDS
Filed Feb. 24, 1958 2 Sheets-Sheet 1

INVENTORS
Jay P. Walker
Clarence O. Glasgow
BY
ATTORNEYS

Feb. 20, 1962 J. P. WALKER ET AL 3,021,709
METHODS AND MEANS FOR SEPARATING LIQUIDS FROM PETROLEUM
STREAMS AND METERING THE SEPARATED LIQUIDS
Filed Feb. 24, 1958 2 Sheets-Sheet 2
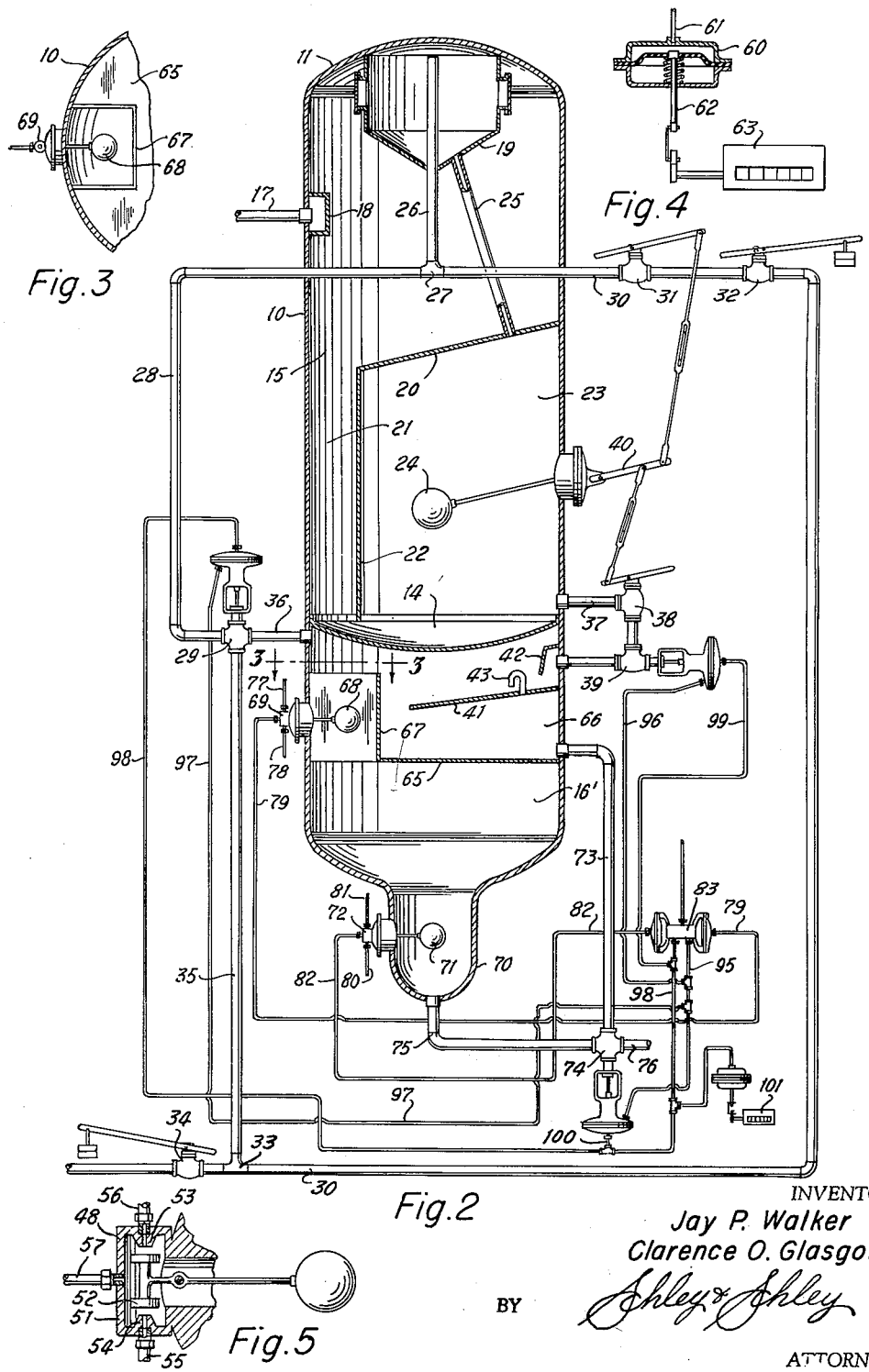
INVENTORS
Jay P. Walker
Clarence O. Glasgow
BY
Ashley & Ashley
ATTORNEYS

United States Patent Office 3,021,709
Patented Feb. 20, 1962

3,021,709
METHODS AND MEANS FOR SEPARATING LIQ-
UIDS FROM PETROLEUM STREAMS AND ME-
TERING THE SEPARATED LIQUIDS
Jay P. Walker and Clarence O. Glasgow, Tulsa, Okla.,
assignors to National Tank Company, Tulsa, Okla., a
corporation of Nevada
Filed Feb. 24, 1958, Ser. No. 716,968
24 Claims. (Cl. 73—200)

This invention relates to new and useful improvements in methods and means for separating liquids from petroleum streams and metering the separated liquids.

The invention is directed specifically to the type of oil and gas separation of petroleum well streams in which the oil is constantly separated from the gas in the incoming stream and automatically measured and discharged in accordance with its rate of accumulation.

There are instances in which it may be desirable to carry out an oil and gas separation step at an elevated pressure or at some predetermined minimum pressure so long as provision can be made for increasing the pressure at which the separation step is carried out when excessive quantities of oil tend to accumulate in the separation chamber, or when the flow of well fluids into the separation chamber momentarily or temporarily reaches abnormal or excessive levels. At the same time, however, it is usually desirable to measure the separated oil at a somewhat lower pressure in order to obtain greater accuracy of measurement, or in order to obtain a stage separation effect prior to discharge of the measured or metered oil into the storage tanks. It is also desirable under some conditions to increase the pressure upon the metering or measuring chamber after the measuring step has been completed in order to provide an adequate pressure boost for forcing or flowing the measured oil to the storage vessels at a more rapid rate so that additional quantities of oil may be received from the separation chamber and measured. In some cases it may be advantageous to maintain a predetermined minimum pressure upon the metering chamber in order to make available a source of relatively low pressure gas supply, or substantially atmospheric pressure may be carried upon the metering chamber, or, even, a slight vacuum.

It is, therefore, one object of this invention to provide improved methods and means for separating the oil and gas of petroleum streams and metering the separated oil wherein provision is made for operating the separation chamber at a predetermined pressure while operating the metering chamber at a somewhat lower pressure.

Another object of the invention is to provide methods and means of the character described wherein the pressure within the separating zone is automatically increased upon accumulation of separated oil therein or upon rapid influx of oil into the zone.

Still another object of the invention is to provide improved methods and means of the character described wherein the metering zone is normally maintained at a predetermined pressure lower than that of the separating zone, but wherein the pressure within the metering zone may be increased to that of the separating zone for accelerated discharge of metered liquids from the metering zone.

An additional object of the invention is to provide improved methods and means of the character described in which the separated liquids may be passed through an intermediate gas separation step prior to discharge into the metering zone for more effective and efficient oil and gas separation, and wherein means is provided for overflowing liquids from the intermediate separation zone to the metering zone in the event normal flow of liquids from one to the other is for any reason impaired.

Yet another object of the invention is to provide improved methods and means of the character described wherein the metering zone may be maintained at a low pressure for the rapid flow of separated liquids thereinto as well as increased accuracy of measurement, but wherein the pressure in the metering chamber may be increased for rapid discharge without appreciable re-solution of gas in the metered liquids.

Still another object of the invention is to provide improved methods and means of the character described in which a low pressure may be maintained upon the separating zone for rapid flow of the well stream thereinto, but in which the back pressure in the separating zone gas outlet may be increased to retard flow into the separating zone, or the gas outlet physically blocked to prevent loss of separated liquids through the gas outlet.

An additional object of the invention is to provide improved methods and means of the character described wherein oil and gas separation may be carried out at two or more pressures, there being provision for boosting the pressure in the separating zone and/or the metering zone as may be found necessary or desirable.

Other and more detailed objects will be apparent from a reading of the following description and specification and reference is made thereto.

A construction designed to carry out the invention will be hereinafter described, together with other features of the invention.

Figure 6:
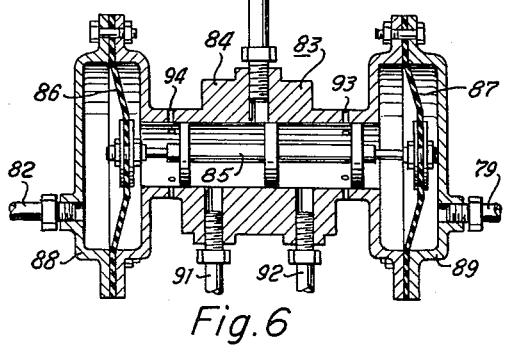

The invention will be more readily understood from a reading of the following specification and by reference to the accompanying drawings, wherein examples of the invention are shown, and wherein:

FIG. 1 is a vertical elevational view illustrating a metering oil and gas separator constructed in accordance with this invention and adapted to carry out the methods hereof, FIG. 2 is a view similar to FIG. 1 illustrating a modified form of the invention, FIG. 3 is a horizontal, fragmentary, cross-sectional view taken upon the line 3—3 of FIG. 2, FIG. 4 is an enlarged vertical view, partly in elevation and partly in section of the counting mechanism, FIG. 5 is an enlarged, fragmentary, sectional view of one of the pilot valves, and FIG. 6 is an enlarged, vertical, sectional view of the four-way valve structure.

This invention is directed to subject matter related to the subject matter disclosed in the copending application of Clarence O. Glasgow and Knox B. Henderson, Serial No. 688,571, filed October 7, 1957, now Patent No. 2,971,376, and the copending application of Knox B. Henderson and James O. Brown, Serial No. 688,867, filed October 8, 1957, and reference is made thereto.

In the drawings, the numeral 10 designates an upright cylindrical tank or vessel having a concave head 11 and a dished bottom 12. The vessel is carried upon a suitable support 13 and is provided with an internal partition 14 dividing the vessel into an upper oil and gas separation chamber 15 and a lower metering chamber 16.

A well stream inlet conductor 17 opens into the chamber 15 through a diverter box 18 for directing a well stream tangentially and circumferentially of the inner wall of the separation chamber for the scrubbing and attrition of gas therefrom. The scrubbing of the well stream upon the wall of the chamber 15 as well as the spreading of the well stream into a thin layer by means of its circumferential flow, results in the rapid and effective evolution of gas from the liquids which may be present, the gas rising to the upper portion of the separation chamber for discharge through a mist extractor 19 which may be of any suitable or desirable type or design. The separated liquids flow downwardly onto the upper surface of an inclined, semi-partition 20 extending across the chamber 15 and whereon the liquids are again spread in a thin film for evolution of gas and freeing of minute gas bubbles, the substantially gas-free oil or liquids passing downwardly from the partition 20 through a flume 21 into the lower portion of the separation chamber. A plate 22 depends from the partition 20 downwardly to a point near the partition 14 to form the flume 21 and also to form with the partition 20 a float enclosure and quieting chamber 23 receiving a float 24 or other suitable liquid level responsive means. Since there will usually be a body of accumulated liquids in the lower portion of the separation chamber standing at all times at a level above the lower edge of the plate 22, the chamber 23 is substantially isolated from the chamber 15 and protected from the turbulence and agitation present in the latter. For pressure equalization as well as the draining of collected liquids from the mist extractor 19, a combined vent and drain pipe 25 extends from the mist extractor downwardly through the partition 20 into the float chamber 23.

A gas discharge conductor 26 extends downwardly within the chamber 15 from the mist extractor 19 and is connected through a T 27 with a first gas outlet pipe 28 leading externally of the vessel 10 to the inlet of a three-way diaphragm-operated valve 29, and with a second gas outlet pipe 30 extending through a lever-operated valve 31 and a back pressure valve 32 to a second T 33 and a second back pressure valve 34. From the back pressure valve 34, the gas outlet pipe 30 extends to a suitable point of use or disposition of the separated gas. One outlet of the three-way valve 29 is connected by a conductor 35 to the T 33, and the other outlet is connected by a conductor 36 into the upper portion of the metering chamber 16. Thus, depending upon the position of the three-way valve 29, the gas space of the metering chamber 16 will be placed in communication with the gas space of the separating chamber 15 or with the gas outlet pipe 30.

For discharging liquids from the separating chamber to the metering chamber, there is provided a drain conductor 37 extending from the bottom portion of the quieting chamber 23 through a lever-operated valve 38 and a diaphragm-operated valve 39 into the upper portion of the metering chamber. The float 24 is provided with an external actuating arm 40 linked to the valves 31 and 38 for simultaneous operation thereof in accordance with the raising and lowering of the float within the quieting chamber 23.

The metering chamber 16 is also provided with a semi-partition 41, similar to the partition 20 and onto the upper surface of which incoming liquids are directed from the conductor 37 by impingement upon a baffle 42 overlying the inlet of the conductor 37 into the metering chamber. The partition 41 is vented through the small pipe 43 at its upper portion, to prevent the trapping of gas thereneath, and also carries a depending skirt 44 at its free edge for forming a downwardly-extending flume 45 and for providing a liquid seal baffle to enclose beneath the partition 41 a turbulence-free quieting or float chamber 46. A float 47 disposed within the chamber 46 is adapted to operate a pilot valve 48, as will be described more fully hereinafter, and an oil or metered liquids discharge conductor 49 leads from the lower portion of the metering chamber through a diaphragm-operated liquid outlet valve 50.

The pilot valve 48 may be of any suitable or desirable type, a conventional pilot valve being illustrated rather schematically in FIG. 5 of the drawings. A valve of this description includes a housing 51 enclosing a double-faced valve core 52 pivotally carried by the operating float and adapted to engage alternately an upper valve seat 53 or a lower valve seat 54. Depending upon the use to which the valve is to be put, either the upper or lower valve seat may communicate with a gas supply conductor, the opposite seat communicating with a gas discharge vent, the particular utilization of the pilot valve in the form of the invention shown in FIG. 1 involving the connection of a gas supply conductor 55 to the lower valve seat 54, and a gas vent 56 to the upper valve seat 53. There is also provided an actuating gas outlet 57 extending from the housing 51 and adapted to be placed in communication alternately with the gas supply conductor or the vent in accordance with the position of the operating float.

In the form of the invention shown in FIG. 1, the gas supply outlet of the pilot valve 48 is connected by a conductor 58 leading to an actuating gas manifold 59 which is in communication with that side of the diaphragm of the valve 39 upon which the application of gas under pressure will cause the valve 39 to open, and is also exposed to the diaphragm of the valve 50 on that side of the diaphragm which will cause the valve 50 to close. The manifold 59 also communicates with the diaphragm of the three-way valve 29 being exposed to that side of the diaphragm upon which the application of gas under pressure will cause the conductors 35 and 36 to be placed in communication with each other, the venting of the actuating gas from the valve 29, of course, placing the conductors 28 and 36 in communication.

In the operation of this form of the invention, the well stream is admitted to the separating chamber or enclosure 15 through the inlet conductor 17 and therein resolved into its gaseous and liquid components as described hereinbefore. Assuming that the measured quantity of separated liquid has been discharged from the metering chamber 16 and that the float 47 is in its lower position, pilot gas under pressure will be admitted through the pilot valve 48 to the manifold 59, thus closing the valve 50, opening the valve 39 and shifting the valve 29 so that the conductors 35 and 36 are in communication therethrough. Under these conditions, the gas space of the metering chamber is isolated from the gas space of the separating chamber, and the pressure carried within the metering chamber 16 is that determined by the setting of the back pressure valve 34 which may maintain storage tank pressure or such degree of light or relatively high back pressure as may be desired. In most instances, it is preferable to operate the metering chamber 16 at a relatively low pressure in order that optimum quantities of gas may be evolved from the liquids flowing thereinto and so that greater accuracy of liquid measurement may be obtained.

Depending upon the quantity of separated liquid accumulated within the chamber 15 and the chamber 23 and consequently the elevation of the float 24 therein, the valve 38 may be in a closed or partially closed position, while the valve 31 may be closed, partially open, or fully open. Under normal operating conditions and normal anticipated liquid levels within the separation chamber 15 and the chamber 23, the float 24 will be at such an elevation as to maintain both of the valves 31 and 38 partially open, this permitting the discharge of separated liquids through the conductor 37 into the metering chamber, while the partial closing of the valve 31 will maintain a back pressure or gaseous pressure within the separating chamber, usually at an elevation higher than that existent within the metering chamber. Of course, the back pressure valve 32 will maintain a predetermined minimum back pressure upon the separating chamber regardless of the position of the valve 31, and desirably, this separating pressure is higher than the metering chamber pressure.

The liquids flow into the metering chamber or enclosure and are spread in a thin wide film over the upper surface of the partition 41 before cascading downwardly through the flume 45, and thus, additional quantities of gas and minute gas bubbles are scrubbed from the liquids as well as being exposed to a lowered pressure in a relatively thin film of liquid for ready separation and removed from the liquid. The liquids continue to accumulate in the metering chamber until the float 47 has been elevated to its upper position, at which point the pilot gas inlet to the pilot valve 48 is closed off and the vent therefrom opened to vent and exhaust the pilot gas pressure from the manifold 59. When this occurs, the valve 39 is closed to stop the flow of separated liquids to the metering chamber, the valve 50 is opened to permit the draining of a measured quantity of liquids from the metering chamber, and the valve 29 is shifted to place the conductors 28 and 36 in communication and to close off the conductor 35. The gas space of the metering chamber is thus exposed to the gas space of the separating chamber to provide a pressure boost for causing the metered liquids to flow more rapidly from the metering chamber, there being no tendency toward re-dissolving or re-solution of gas under pressure in the separated liquids because of the relatively quiet conditions existent at this point in the metering chamber, the relatively short length of time required for draining of the metering chamber and hence the period of time in which gas could be re-dissolved in the metered liquids, and the fact that only a limited surface area of liquids is exposed to the gas under pressure. Following draining of the metering chamber and lowering of the float 47, the pilot valve is again shifted, and a second metering cycle commenced. Of course, the chamber 16 may be rather accurately calibrated as to the volume of liquids discharged between upper and lower positions of the float 47, and hence, each cycle results in the delivery and discharge of a predetermined and measured quantity of liquid, normally oil or other petroleum liquids.

In order that a record may be maintained of the number of times the metering chamber has been filled and emptied, a suitable counter structure of any desirable type may be connected to the apparatus, preferably into the pilot gas manifold 59 so as to record each cycle or each pressuring of this manifold. A suitable structure is illustrated in FIG. 4 in which a diaphragm or pressure-responsive unit 60 is connected into the manifold 59 through a conductor 61, the diaphragm structure having a plunger 62 mechanically linked to a counter unit 63 for advancing the unit for each pressure increase or decrease which takes place in the diaphragm structure 60 and hence in the manifold 59. Thus, a record is automatically kept of the number of cycles through which the apparatus has operated, and knowing the volume of liquid discharged from the metering chamber on each cycle, the total volume of liquids discharged from the separating and metering apparatus may readily be determined.

It may occur that during the emptying of the metering chamber separated liquids will tend to accumulate at an excessive rate within the separating chamber, the flow of the well may temporarily increase, or the well stream may even tend to surge and deliver in a short period of time rather large quantities of liquid into the separator chamber. When this occurs, the rising liquid level will elevate the float 24, partially or fully closing the valve 31 and increasing the pressure within the separating chamber to impede the flow of fluids into the separating chamber as well as to increase the pressure within the metering chamber and hence accelerate the discharge of the metered liquids therefrom. Should such increased flow occur during periods when the separation chamber is draining into the metering chamber, the elevation of the float 24 will not only close or partially close the valve 31 and increase the pressure within the separating chamber, but will also increase the degree of opening of the valve 38 to facilitate increased flow from the separating chamber to the metering chamber. The increased pressure in the separation chamber will not be communicated to the metering chamber under the latter circumstances, but will be effective to accelerate the rate of flow into the metering chamber.

It is possible that one or more of the diaphragm-operated valves could stick or malfunction in some respect so as to impede or terminate the discharge of liquids from the separation chamber or from the metering chamber, and under these conditions, the abnormal liquid levels necessarily obtaining within the separating chamber would raise the float 24 to a point at which the valve 38 would be fully open, but at the same time, the valve 31 would be fully closed, and hence, although the liquid level within the separation chamber might rise to the upper end of the gas outlet conductor 26, there could be no loss of liquids through the gas outlet pipe due to the complete closing of the valve 31. Under these conditions, the unit would simply shut itself down and would fail to complete any additional cycles until whatever mechanical difficulty is present has been corrected.

There may also be occasions upon which liquid flows into the separating chamber are relatively low so that liquid might discharge from the separation chamber into the metering chamber faster than it was being introduced into the former. Under these conditions, the lowering of the float 24 would function to open the valve 31 to its fullest extent, thus minimizing the pressure in the separating chamber and encouraging the flow of liquids thereinto, and at the same time, the valve 38 would be closed to prevent further discharge of liquids from the separation chamber until the liquids had accumulated therein to a normal operating level. It is to be noted that the discharge pipe 37 opens into the metering chamber at an elevation above the lower end of the depending skirt or baffle 22, and hence, at no time, does the liquid level in the separation chamber descend below said lower edge and permit the loss of the gas seal provided thereby.

It is pointed out that the valves 31 and 32 may be combined into a single valve structure having both a lever operated arm and a weight actuated arm, and that the valve 34 may be omitted entirely if the metering chamber is to be filled under storage tank pressures, or if, for other reason, lower pressures, such as atmospheric pressure, or even pressure below atmospheric, are desired to be maintained in the metering chamber. When, however, the back pressure valve 34 is employed, it may be desirable to include in the structure a branch gas conductor 64 leading from the pipe 30 between the T 33 and the valve 34 to supply gas under moderate pressure for the firing of heaters or other local use in the adjacent area.

It is pointed out that the structure, except in some instances when abnormal operating conditions have occurred, provides for oil and gas or liquid and gas separation in the metering chamber 15 at a predetermined pressure, followed by further separation of gas from the liquids in the metering chamber at a somewhat lower pressure. This not only results in more effective and efficient gas and liquid separation, but also encourages the rapid flow of liquids from the separation chamber to the metering chamber while increasing the metering accuracy. The pressure on the metering chamber will be boosted or increased during its discharge period, while the pressure in the separation chamber, above the minimum determined by the setting of the back pressure valve 32, is varied in accordance with the rate of flow into the separation chamber, and, at times, the rate of discharge from the separation chamber to the metering chamber. Under usual operating conditions, the pressure in the separation chamber will be relatively low to encourage high rates of fluid flow thereinto, but when liquid tends to accumulate at an abnormal or higher than desirable rate within the separation chamber, the partial closing of the valve 31 will increase the pressure in the separation chamber to impede partially the influx of the well stream thereinto as well as to accelerate the discharge of separated liquids therefrom.

A modified form of the invention is illustrated in FIG. 2 of the drawings, this modified form functioning in much the same manner as the previously described modification but adding thereto an additional gas separation step or enclosure along with control of the filling and emptying of the metering chamber by upper and lower floats rather than a single float.

The upper portion of the modified form of the invention is substantially identical to that of the form shown in FIG. 1, and the same reference numerals have been applied to the same elements and parts. The gas discharge and flow arrangement is also substantially identical to the first form of the invention, and here again, the same numerals have been employed to identify corresponding portions of the apparatus.

The separated liquids are discharged from the separation chamber or enclosure 15 through the outlet conductor 37 and the valves 38 and 39 into the space beneath the partition 14, the stream being deflected downwardly by the baffle 42 onto the upper surface of the inclined semi-partition 41. The skirt 44 is omitted, and instead, a transverse partition 65 extends across the upper portion of the part of the vessel 10 disposed below the partition 14 to divide the lower portion of the vessel into an upper, gas separating space 66 and a lower metering chamber 16'. An open-top box or enclosure 67 extends upwardly through the partition 65 into the chamber 66 and receives a float 68 having an external pilot valve 69. The metering chamber or enclosure 16' is further modified by being provided with a central, depending sump or float enclosure 70, of considerably less cross-sectional area than the chamber 16', and also receiving a float 71 having an external pilot valve 72. A separated liquids conductor 73 leads from the lower portion of the chamber 66 immediately above the partition 65 to a diaphragm-operated three-way valve 74, the latter valve having one of its outlets connected through a drain conductor 75 extending to the lower portion of the sump 70, and its other outlet receiving a liquid discharge conductor 76.

The pilot valves 69 and 72 may be of any suitable or desirable type and may be similar to the pilot valve 43 illustrated in FIG. 5 of the drawings. The upper pilot valve 69 has its upper valve seat connected to a source of pilot gas under pressure through a conductor 77 while its lower valve seat is connected to a vent pipe 78. The pressure gas outlet 57 of the upper pilot valve is connected to a pilot gas conductor 79 so as to supply pilot gas under pressure to the conductor 79 when the float 68 is in its elevated position.

The lower pilot valve 72 is connected in the opposite direction, the lower valve seat thereof being connected to a pilot gas supply conductor 80, its upper valve seat connected to a vent pipe 81, and its pilot gas outlet being connected to a pilot gas conductor 82 for supplying pilot gas under pressure to the latter conductor when the float 71 is in its lower position.

The conductors 79 and 82 are connected to the opposite ends of a four-way switching valve 83 which, again, may be of any suitable or desirable type, a typical structure being shown in FIG. 6 of the drawings. This structure includes a valve housing 84 having a multiple piston valve rod 85 therein, the two ends of the piston being connected to diaphragms 86 and 87 enclosed within diaphragm housings 88 and 89 to which the pilot gas supply conductors 82 and 79 are connected, respectively. There is provided a central pilot gas supply conductor 90 and spaced pilot discharge conductors 91 and 92 to which the pilot gas under pressure is alternately changed or switched in accordance with transverse movement of the valve rod 85. The structure is springless, and obviously, when gas under pressure is supplied through the conductor 82, the valve core is shifted to the right, as viewed in FIG. 6, exposing the pilot gas supply to the pilot gas conductor 91 while placing the conductor 92 in communication with vent ports 93. Removal of the application of pilot gas under pressure through the conductor 82 will not result in shifting of the valve, and such shifting will take place only when pilot gas under pressure is supplied through the conductor 79 to shift the valve core to the left, exposing the conductor 91 to the ports 94 and bringing the pilot gas supply into communication with the conductor 92 to supply pilot gas under pressure thereto.

The diaphragm-operated valves employed in this modification of the invention are of the type in which the diaphragm is positively actuated by pilot gas under pressure both for opening and closing of the valves or for shifting the three-way valves from one position to another. Accordingly, the pilot gas outlet 92 of the four-way valve 83 is connected into a manifold 95 which, in turn, is connected by a conductor 96 with the space on that side of the diaphragm of the valve 39 upon which the application of pressure will close the valve, through a conductor 97 to the space on that side of the diaphragm of the three-way valve 29 upon which the application of pressure will cause the valve to shift into a position to place the conductors 28 and 36 in communication, and directly to the space on that side of the diaphragm of the valve 74 upon which the application of pressure will place the conductors 75 and 76 in communication. Similarly, the pilot gas outlet 91 of the four-way valve 83 is connected to a manifold 98 from which a pilot gas conductor 99 leads to the diaphragm of the valve 39 and is in communication with that side of the diaphragm upon which the application of pressure will tend to open the valve 39. The manifold 98 is also connected by a conductor 100 to the diaphragm of the valve 74 and exposed to that side of the diaphragm upon which the application of pressure will shift the valve 74 to place the conductors 73 and 75 in communication, and the manifold 98 is likewise extended to the diaphragm of the valve 29 and exposed to that side of the diaphragm upon which the application of pressure will place the conductors 35 and 36 in communication. A suitable diaphragm-operated counter structure 101, which may be similar to the counter unit employed in the modification of FIG. 1 and illustrated in detail in FIG. 4, or may be of any other suitable or desirable type, is connected to either of the manifolds 95 or 98, so as to be actuated to record one unit or one cycle during each complete metering cycle of the separator structure.

The operation of this form of the invention is substantially the same as that of the first modification insofar as pressure maintenance, variations, and regulation is concerned, and insofar as the separation of gas and liquids in the primary chamber 15 is involved. The principal differences of operation are to be found in the auxiliary gas separation step carried out between the primary separation and liquid metering steps, and in the utilization of two floats in the metering chamber rather than one float. Assuming the draining of a measured quantity or volume of liquids from the metering chamber 16' to be nearing its completion, the four-way switching valve 83 will have its valve core shifted to the left so as to place pilot gas under pressure in communication with the outlet 92 and the manifold 95 whereby the valve 74 will be held in such position as to open the outlet conductor 76 to the drain conductor 75 for draining of the metering chamber, and the valve 29 will be held in its upper position so as to place the conductors 28 and 36 in communication and hold the gas pressure in the metering chamber at the same level as the pressure within the separation chamber 15. The valve 39 will also be held closed to prevent the drainage of separated liquids from the chamber 15 to the secondary separation chamber or zone 66 and thus avoid any possible spilling over of liquids into the metering chamber through the open upper end of the box 67.

As the liquid level falls within the reduced sump 70 and moves the float 71 to its lower position, the pilot valve 72 is switched to place pilot gas under pressure in the conductor 82, thus shifting the valve core of the switching valve 83 to the right into the position shown in FIG. 6, the shifting of the diaphragm 87 to the right being made possible because the float 68 will be in its lowered position and the pilot gas conductor 79 will be open to the vent 78 of the pilot valve 69.

The shifting of the switching valve by the dropping of the float 71 will place pilot gas under pressure in the outlet 91 of the switching valve and the manifold 98, the pressurizing of the manifold 98 resulting in the simultaneous opening of the valve 39, the actuation of the counting mechanism 101, the shifting of the valve 74 to place the conductors 73 and 75 in communication, and the shifting of the valve 29 to place the conductors 35 and 36 in communication. The pressure within the metering chamber, as well as in the secondary separation zone 66, is thus reduced to that maintained by the back pressure valve 34, the draining of liquids from the metering chamber is terminated, the flow of liquids from the separating chamber 16 to the secondary separation zone 66 is initiated, and the draining of liquids from the secondary separation zone into the metering chamber 16' is likewise commenced.

As the liquid level rises in the metering chamber, the float 71 will be elevated so as to open the pilot gas conductor 82 to the vent 81 of the pilot valve 72, but since the switching valve 83 is of the springless variety, this will not result in any shifting or actuation of the valve 83.

The incoming well stream will have undergone a first gas and liquid separation step within the chamber 15, resulting in the removal of the major portion of any gases which may be present, such separation being carried out at the pressure maintained by the valves 31 and 32. Now, the separated liquids drain through the conductor 37 into the secondary separation zone 66 in which the liquids are spread into a thin film upon the upper side of the semi-partition 41, are exposed to a somewhat lower gas pressure, and hence, receive a second scrubbing and gas denuding step resulting in removal of further quantities of gas and a degree of stabilization of these liquids to such point that they may be retained under storage tank conditions without appreciable further evolution of gas. The additionally scrubbed liquids flow from the zone 66 through the conductor 73 and the conductor 75 into the metering chamber, again, the metering or measuring operation being carried out at a low pressure for increased accuracy as well as maximum evolution of gas.

When the liquid level within the metering chamber rises within the box 67 and elevates the float 68, the pilot valve 69 will be shifted to place pilot gas under pressure in communication with the conductor 79, again resulting in a shifting of the switching valve 83 to move the valve core 85 thereof to the left and again switching pilot gas under pressure to the outlet 92 of the switching valve and the manifold 95. Simultaneously, the outlet 91 of the switching valve and the manifold 98 will be vented through the ports 94, the switching of the valves 29, 39, and 74, will again be carried out, and discharge of the measured quantity of separated liquids from the metering chamber 16' will commence while the draining of liquids from the separating chamber 15 into the secondary separation zone 66 is terminated. Obviously, the cycle continues to repeat itself so long as liquids are flowing into the separation chamber 15, the float 24 functioning as in the first described form of the invention to control the positions of the valves 31 and 38 and regulate the flow of the well stream into the primary separation chamber, as well as the discharge of separated liquids therefrom, in accordance with the rate of liquid accumulation in the separation chamber and the rate of flow from the producing well thereinto. In this form of the invention, as in the first described form, the valves 31 and 32 may be combined into a single composite valve structure, the back pressure settings of the valves 32 and 34 may be set at any suitable or desirable levels, the valve 34 may be omitted completely under certain conditions, such as production of the separated liquids at atmospheric pressure or storage tank pressure, or even under vacuum conditions as sometimes occur when the separated gas is being conducted to a gasoline plant or other type of installation for further scrubbing and denuding of the separated gas of any liquefiable hydrocarbons which may be present therein. Again, the spacing of the floats 68 and 71 will result in the discharge of a predetermined quantity of liquid from the metering chamber 16' upon each cycle, and the recording of the cycles by the counter 101 will make available a very quickly determinable record of the quantity of separated liquids which have passed through the unit. Of course, the switching valve and the various pilot valves may be of any suitable or desirable nature, may be mechanical, hydraulic, pneumatic, or electrical in operation, and the valves 29, 39 and 74, may also be of any suitable type and actuated in any desired manner. All of these control methods for opening and closing valves in accordance with certain requirements are conventional in the art, it having been found most suitable to employ the system described in which the valves are operated by pilot gas under pressure since such pilot gas is readily available from the upper portion of the separation chamber 15, from other separators, or any other suitable source.

It is also to be noted that the positioning of the floats 68 and 71 in enclosures of relatively small cross-sectional area results in greater accuracy of measuring or metering, as compared to the float 47 of the first form of the invention which is positioned in a relatively large chamber, since the liquid levels within the box 67 and the sump 70 will change at a much greater rate in accordance with the flow of liquid into the metering chamber than will occur in the type of metering chamber shown in FIG. 1. Thus, for a given volume of liquids flowing into the metering chamber 16', the liquid level in the sump 70 or in the box 67 will change to a considerably greater extent than would the level in the metering chamber 16 of the first form of the invention, and the floats 68 and 71 will accordingly be caused to actuate their pilot valves in response to a somewhat smaller liquid influx than the float 47. Manifestly, greater accuracy of measuring results, and over-travel or under-travel of the floats 68 and 71 becomes of much less consequence.

It is also to be noted that the open top of the box or enclosure 67 makes provision for a spillover of liquids from the zone 66 to the metering chamber 16' should the valve 74 malfunction, or should liquids enter the zone 66 faster than they can be removed through the conductor 73. The meter chamber floats will still operate in the same fashion, regardless of such spillover, and effective measurement of the discharged liquids continue.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, discharging a predetermined quantity of separated liquid from the metering chamber, and increasing the pressure on the metering chamber while the separated liquid is being discharged.

2. The method of separating liquids from a well stream and metering the separated liquid including, flowing the well stream into a gas separation chamber wherein the stream is resolved into gaseous and liquid portions, flowing the liquid portion into a metering chamber, maintaining the gas separation chamber at a higher pressure than the metering chamber, discharging a predetermined quantity of separated liquid from the metering chamber, and increasing the pressure on the metering chamber to the pressure of the gas separation chamber while the separated liquid is being discharged.

3. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, regulating the pressure in the gas separation chamber in accordance with the rate of accumulation of the separated liquid portion therein, discharging a predetermined quantity of separated liquid from the metering chamber, and increasing the pressure on the metering chamber while the separated liquid is being discharged.

4. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, regulating the flow of the separated liquid portion from the gas separation chamber to the metering chamber in accordance with the rate of accumulation of the separated liquid portion in the gas separation chamber, discharging a predetermined quantity of separated liquid from the metering chamber, and increasing the pressure on the metering chamber while the separated liquid is being discharged.

5. The method as set forth in claim 1, and passing the separated liquid portion through a second gas separation chamber prior to flowing the liquid portion into the metering chamber.

6. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, increasing the pressure in the gas separation chamber as the rate of accumulation of separated liquid therein increases, discharging a predetermined quantity of separated liquid from the metering chamber, and increasing the pressure on the metering chamber while the separated liquid is being discharged.

7. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, increasing the flow of the separated liquid portion from the gas separation chamber to the metering chamber as the rate of accumulation of separated liquid in the gas separation chamber increases, discharging a predetermined quantity of separated liquid from the metering chamber, and increasing the pressure on the metering chamber while the separated liquid is being discharged.

8. The method as set forth in claim 1 including, flowing the separated liquid portion into a second gas separation zone from the gas separation chamber and then flowing the separated liquid from said zone to the metering chamber, and terminating the flow of liquid from the gas separation chamber to the second gas separation zone and from said zone to the metering chamber when liquid is being discharged from the metering chamber.

9. A liquid and gas separator for well streams including, a gas separation enclosure for separating a well stream into gas and liquid portions, a metering enclosure for the separated liquid portion, means for flowing separated liquid from the separation enclosure to the metering enclosure, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

10. A liquid and gas separator for well streams including, a gas separation enclosure for separating a well stream into gas and liquid portions, a metering enclosure for the separated liquid portion, means for flowing separated liquid from the separation enclosure to the metering enclosure, means for discharging at intervals predetermined quantities of liquid from the metering enclosure and recording the number of such discharges, means for maintaining the separation enclosure at a higher pressure than the metering enclosure, and means for increasing the pressure in the metering enclosure to the pressure of the separation enclosure while liquid is being discharged from the metering enclosure.

11. A liquid and gas separator for well streams including, a gas separation enclosure for separating a well stream into gas and liquid portions, a metering enclosure for the separated liquid portion, means for flowing separated liquid from the separation enclosure to the metering enclosure, means for regulating the pressure in the gas separation enclosure in accordance with the rate of accumulation of the separated liquid portion therein, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

12. A liquid and gas separator for well streams including, a gas separation enclosure for separating a well stream into gas and liquid portions, a metering enclosure for the separated liquid portion, means for flowing separated liquid from the separation enclosure to the metering enclosure, means for regulating the flow of the separated liquid portion from the gas separation enclosure to the metering enclosure in accordance with the rate of accumulation of the separated liquid portion in the gas separation enclosure, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

13. A liquid and gas separator for well streams including, a gas separation enclosure for separating a well stream into gas and liquid portions, a metering enclosure for the separated liquid portion, means for flowing separated liquid from the separation enclosure to the metering enclosure, means for increasing the pressure in the gas separation enclosure as the rate of accumulation of separated liquid therein increases, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

14. A liquid and gas separator for well streams including, a gas separation enclosure for separating a well stream into gas and liquid portions, a metering enclosure for the separated liquid portion, means for flowing separated liquid from the separation enclosure to the metering enclosure, means for increasing the flow of the separated liquid portion from the gas separation enclosure to the metering enclosure as the rate of accumulation of separated liquid in the gas separation enclosure increases, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

15. A liquid and gas separator for well streams including, a first gas separation enclosure for separating a well stream into gas and liquid portions, a metering enclosure for the separated liquid portion, a second gas separation enclosure, means for flowing separated liquid from the first separation enclosure to the second separation enclosure, means for flowing liquid from the second separation enclosure to the metering enclosure, means for discharging at intervals predetermined quantities of liquid from the metering enclosure and recording the number of such discharges, means for maintaining the first separation enclosure at a higher pressure than the metering enclosure, and means for increasing the pressure in the metering enclosure while liquid is being discharged therefrom.

16. A liquid and gas separator for well streams including, a first gas separation enclosure for separating a well stream into gas and liquid portions, a metering enclosure for the separated liquid portion, a second gas separation enclosure in pressural communication with the metering enclosure, means for flowing separated liquid from the first separation enclosure to the second separation enclosure, means for flowing liquid from the second separation enclosure to the metering enclosure, means for discharging at intervals predetermined quantities of liquid from the metering enclosure and recording the number of such discharges, means for maintaining the first separation enclosure at a higher pressure than the metering enclosure, and means for increasing the pressure in the metering enclosure while liquid is being discharged therefrom.

17. A liquid and gas separator for well streams including, a gas separation enclosure for separating a well stream into gas and liquid portions, means in the separation enclosure for spreading the well stream into a thin film, a metering enclosure for the separated liquid portion, means for flowing separated liquid from the separation enclosure to the metering enclosure, means in the metering enclosure for spreading the liquid into a thin film, means for discharging at intervals predetermined quantities of liquid from the metering enclosure and recording the number of such discharges, means for maintaining the separation enclosure at a higher pressure than the metering enclosure, and means for increasing the pressure in the metering enclosure while liquid is being discharged therefrom.

18. A liquid and gas separator for well streams including, a first gas separation enclosure for separating a well stream into gas and liquid portions, means in the separation enclosure for spreading the well stream into a thin film, a metering enclosure for the separated liquid portion, a second gas separation enclosure, means for flowing separated liquid from the first separation enclosure to the second separation enclosure, means in the second separation enclosure for spreading the liquid in a thin film, means for flowing liquid from the second separation enclosure to the metering enclosure, means for discharging at intervals predetermined quantities of liquid from the metering enclosure and recording the number of such discharges, means for maintaining the first separation enclosure at a higher pressure than the metering enclosure, and means for increasing the pressure in the metering enclosure while liquid is being discharged therefrom.

19. The method of separating liquids from a well stream and metering the separated liquids including, flowing the well stream into a gas separation chamber wherein the stream is resolved into gaseous and liquid portions, flowing the liquid portion into a metering chamber, maintaining the gas separation chamber at a higher pressure than the metering chamber, maintaining the metering chamber at approximately atmospheric pressure while the liquid portion is flowing thereinto, and discharging a predetermined quantity of separated liquid from the metering chamber.

20. The method of separating liquids from a well stream and metering the separated liquids including, flowing the well stream into a gas separation chamber wherein the stream is resolved into gaseous and liquid portions, flowing the liquid portion from the gas separation chamber into a second gas separation zone, flowing the liquid portion from the second gas separation zone into a metering chamber, maintaining the gas separation chamber at a higher pressure than the second gas separation zone and a higher pressure than the metering chamber, and discharging a predetermined quantity of separated liquid from the metering chamber.

21. A liquid and gas separator for well streams including, a gas separation enclosure for separating a well stream into gas and liquid portions, a metering enclosure for the separated liquid portion, means for flowing separated liquid from the separation enclosure to the metering enclosure, means for discharging at intervals predetermined quantities of liquid from the metering enclosure, means for maintaining the separation enclosure at a higher pressure than the metering enclosure, and means for maintaining the metering enclosure at substantially atmospheric pressure at least while liquid is being flowed thereinto.

22. A liquid and gas separator for well streams including, a first gas separation enclosure for separating a well stream into gas and liquid portions, a second gas separation enclosure, a metering enclosure for the separated liquid portion, means for flowing separated liquid from the first separation enclosure to the second separation enclosure, means for flowing liquid from the second separation enclosure to the metering enclosure, means for discharging at intervals predetermined quantities of liquid from the metering enclosure, and means for maintaining the first separation enclosure at a higher pressure than the second separation enclosure and a higher pressure than the metering enclosure.

23. A liquid and gas separator for well streams including, a gas separation enclosure for separating a well stream into gas and liquid portions, a gas outlet conductor from the separation enclosure, pressure controlling means in the gas outlet conductor for establishing a reduced pressure in the gas outlet conductor downstream of the pressure controlling means, a metering enclosure for the separated liquid portion, a liquid outlet from the separation enclosure, means responsive to the liquid level in the metering enclosure for admitting to and discharging from the metering enclosure separated liquids from the separation enclosure, means for exposing the metering enclosure to the reduced pressure in the gas outlet conductor downstream of the pressure controlling means when the metering enclosure is filling and to the higher pressure in the gas outlet conductor upstream of the pressure controlling means when the metering enclosure is discharging, and means for recording the filling and emptying cycles of the metering enclosure.

24. The method of separating a well stream into its liquid and gas components and metering the separated liquid including, directing the well stream into a liquid and gas separator enclosure wherein the well stream separates into liquid and gas components, withdrawing separated gas from the separator enclosure, flowing separated liquid from the separator enclosure to a metering enclosure, alternately filling and emptying the metering enclosure with the separated liquid and recording the number of fillings and emptyings, discharging the liquid emptied from the metering enclosure, maintaining the separator enclosure at a predetermined pressure, maintaining the metering enclosure a predetermined pressure lower than that maintained in the separator enclosure during filling of the metering enclosure, and increasing the pressure in both the separator enclosure and the metering enclosure when the metering enclosure is emptying and a high liquid level occurs in the separator enclosure.

References Cited in the file of this patent
UNITED STATES PATENTS

| | | |
|---|---|---|
| 2,097,829 | Bassler | Nov. 2, 1937 |
| 2,158,381 | Raymond | May 16, 1939 |
| 2,211,282 | McKeever | Aug. 13, 1940 |